Patented June 24, 1941

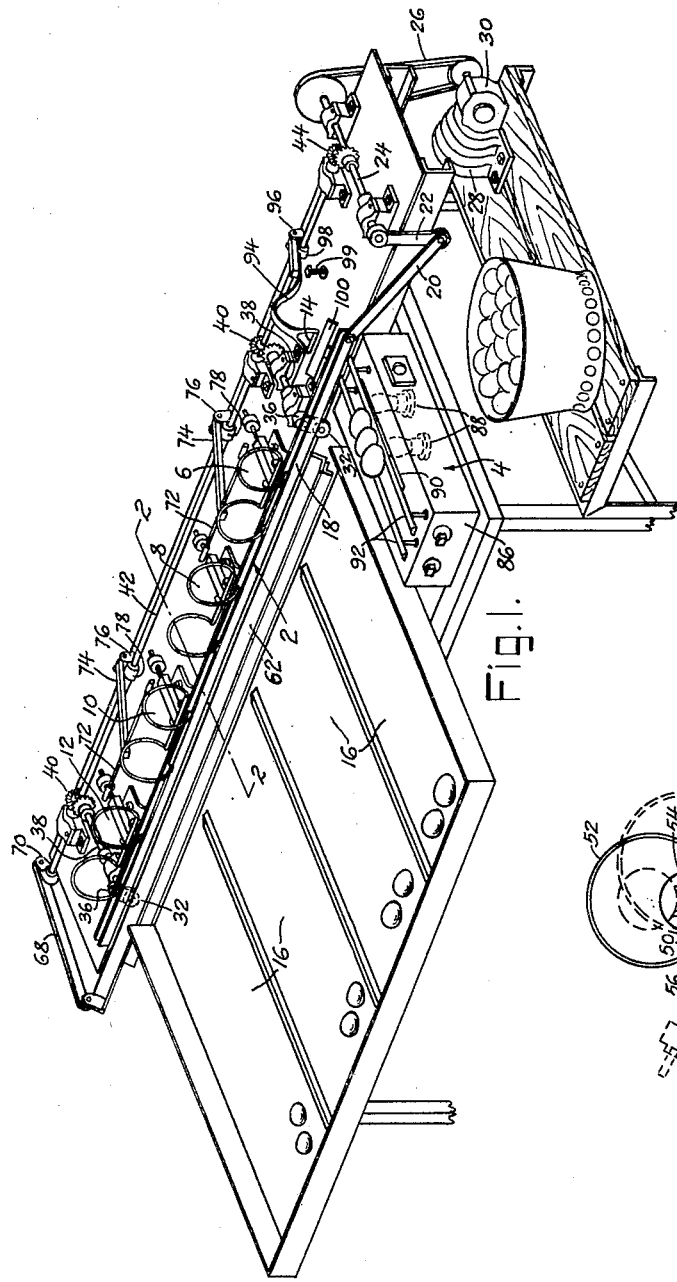

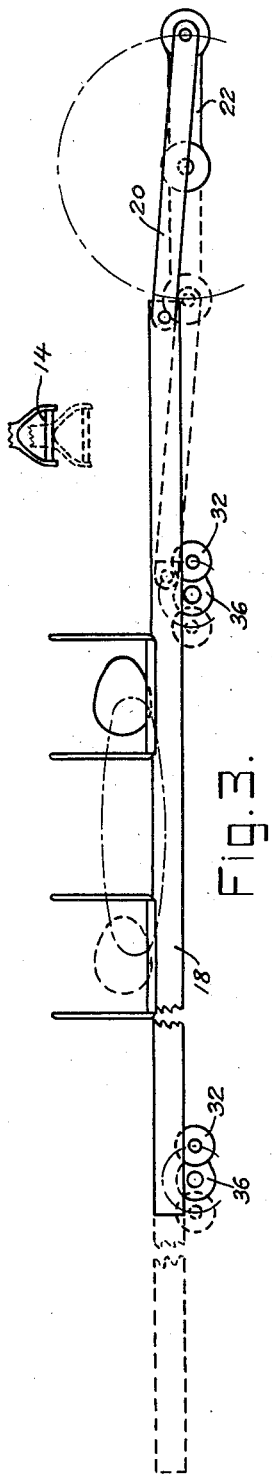
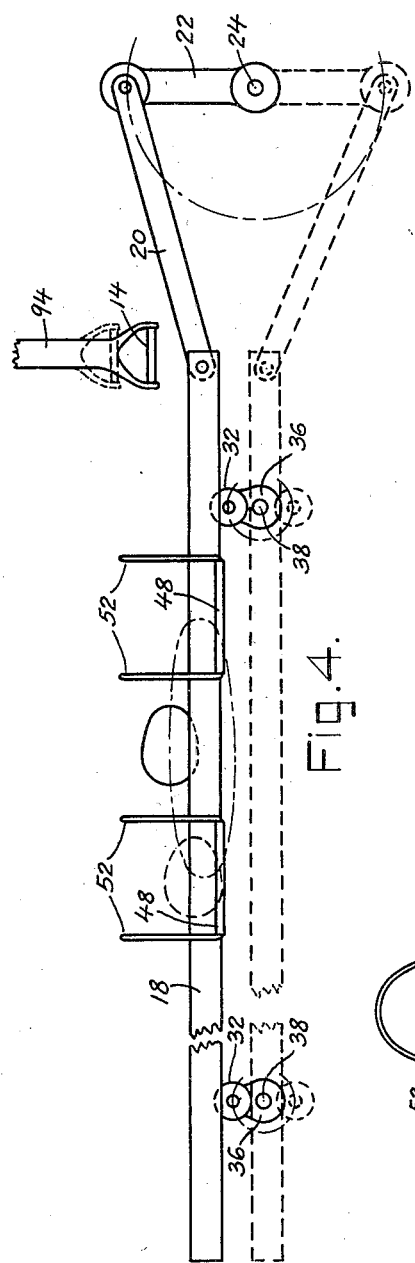
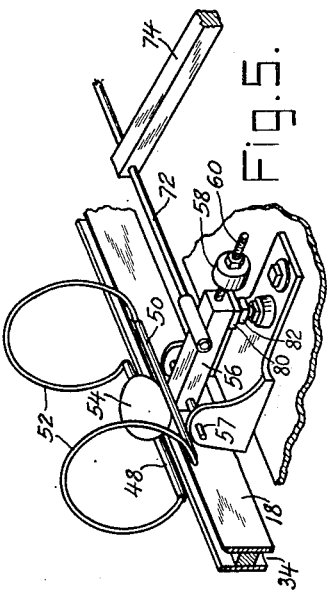

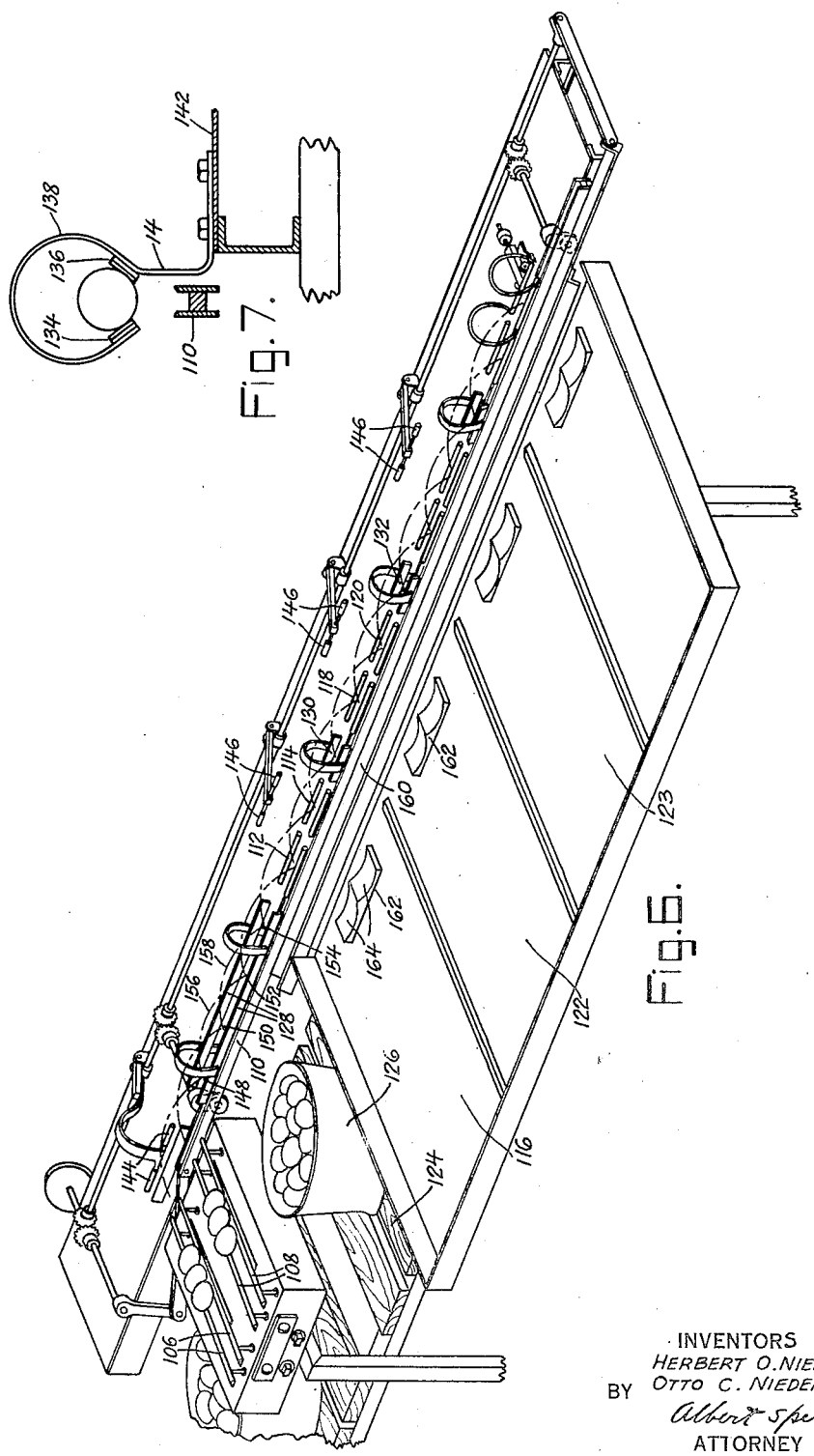

2,246,597

UNITED STATES PATENT OFFICE 2,246,597

EGG GRADING MECHANISM

Herbert O. Niederer and Otto C. Niederer,
Titusville, N. J.

Application January 16, 1939, Serial No. 251,118

12 Claims. (Cl. 209—121)

Our invention relates to egg handling mechanism and particularly to devices for weighing and sorting eggs. While our invention may be used by itself in handling eggs it is particularly adapted for use in combination with egg candling means whereby eggs may be graded both as to quality and as to weight in substantially a continuous operation.

Various types of egg grading devices are known as exemplified by the egg candling and sorting mechanism described and claimed in the patent to Otto Niederer No. 2,093,338 wherein eggs are candled and then pass by gravity to weighing mechanism for sorting them into different classes or grades. However, all previous devices of this character with which we are familiar are limited in their capacity by reason of the fact that the weighing means employed for grading the eggs are actuated improperly due to vibration or other movement of the eggs when deposited thereon in rapid succession. Moreover, in some instances the conveying means employed for moving the eggs from one position to another tend to crush or break the eggs when they are not positioned accurately for engagement thereby or when moved from one conveying element to another. Therefore when the mechanism is speeded up to handle a sufficiently large number of eggs to warrant the use of an egg grading machine the danger of breakage is greatly increased and the accuracy of the weighing or sorting means is decreased.

Our invention eliminates these difficulties and objections to constructions of the prior art and renders it possible to deliver eggs to weighing mechanism and to grade them accurately at speeds far greater than has been possible heretofore. This is accomplished by providing means for positively moving the eggs quickly and yet gently from one position to another without pushing, rolling or turning them, and by the use of weighing means rendered operative only when the eggs and weighing means have come to a stable condition and are properly located to avoid inaccuracies and disturbances due to the movement of the eggs from one position to another. Our invention also includes means for moving graded eggs away from the weighing means so as to prevent eggs being discharged therefrom from interfering with the operation of the weighing means or the subsequent discharge of other eggs on conclusion of succeeding weighing operations. Further our invention embodies means for positively insuring the return of elements of the weighing means to their proper weighing position after the discharge of an egg therefrom and before another egg is delivered thereto.

One of the objects of our invention is to provide a novel type of egg handling mechanism wherein eggs may be positively moved quickly and yet gently from one position to another without pushing, turning or rolling the eggs.

Another object of our invention is to provide means for weighing eggs with elements which serve to locate the eggs accurately with respect to the weighing means so as to insure proper operation of the weighing device.

A further object of our invention is to provide egg weighing means with mechanism for insuring stabilizing of the egg and weighing means before a weighing operation takes place.

Another object of our invention is to provide egg handling and weighing mechanism which is simple and dependable in construction and uniform in operation at various speeds.

Other objects of our invention are to reduce the breakage of eggs in handling and grading thereof and to increase the speed at which eggs may be handled and graded.

These and other objects and features of our invention will appear from the following description thereof in which reference is made to the accompanying figures of the drawings.

In the drawings:

Fig. 1 is a perspective of a typical form of egg handling and grading mechanism embodying our invention.

Fig. 2 is an enlarged vertical sectional view of a portion of the mechanism illustrated in Fig. 1 taken on the line 2—2 thereof and looking toward the receiving end of the mechanism.

Fig. 3 is a diagrammatic vertical sectional view of a detail of the egg handling mechanism with the parts located in position to engage the eggs.

Fig. 4 is a view similar to Fig. 3 showing the parts in the position assumed thereby when advanced one-fourth of a cycle from the position illustrated in Fig. 3.

Fig. 5 is an enlarged perspective showing the form of weighing mechanism embodied in the construction illustrated in Fig. 1.

Fig. 6 is a diagrammatic illustration of a portion of a modified form of our invention having twice the capacity of the construction illustrated in Fig. 1.

Fig. 7 is an enlarged vertical sectional view of a detail of the construction illustrated in Fig. 6.

Referring to the form of our invention shown in Fig. 1 the device embodies egg conveying means indicated generally at 2 adapted to receive eggs from an egg candling device 4 or from any other suitable source or means and serving to move the eggs into position to be graded by weighing means 6, 8, 10 and 12 located at spaced intervals lengthwise of the egg conveying means.

The eggs are delivered from the candling device 4 to the egg conveying means 2 in the proper manner by stop means 14 which engage the eggs and permit delivery thereof one at a time at the desired period in the cycle of operations. Thereafter each egg is lifted and transported by the egg conveying means so as to be moved forward positively, step by step from the candling means to each of the weighing means 6, 8, 10 and 12 in succession, the egg being lowered and allowed to come to rest momentarily before being again raised and advanced along the machine. When the egg reaches a weighing device capable of being actuated by an egg of that weight it is discharged thereby into the proper tray or compartment 16 of the receiving apron for packing in crates or for other distribution or handling thereof.

The egg conveying means illustrated in the drawings is typical of the type of mechanism preferred for this purpose and includes a bar 18 extending lengthwise of the machine. The bar is moved back and forth by means of a link 20 connected to a crank 22 on shaft 24, which in turn is driven by a belt 26 from a motor 28 through reduction gear 30. During longitudinal movement of the bar it is raised and lowered by means of rollers 32 located adjacent the opposite ends thereof and movable within a channel 34 in the lower surface of the rod. The rollers 32 are carried by cranks 36 driven by shafts 38 through bevelled gears 40 and shaft 42. The latter shaft is driven by bevelled gears 44 from the shaft 24 and the motor 28. With this construction the movement of the cranks 36 and rollers 32 in raising and lowering the bar 18 is synchronized with the longitudinal movement of the bar by the link 20 and crank 22 so that the bar as a whole is given an elliptical movement as shown more clearly in Figs. 3 and 4.

The upper surface of the bar is provided with spaced upwardly and outwardly inclined surfaces 46 for receiving eggs from the candling means 4 and serving to center the eggs with their longitudinal axis extending parallel to the conveying bar 18. Eggs moving into position above the conveying bar are first engaged by the bar when it is in the position shown in Fig. 3. Thereafter as the cranks 22 and 36 continue to rotate in counter-clockwise directions from the position of Fig. 3 to that of Fig. 4 the egg is lifted upward and moved forward to a new position where they are lowered and deposited upon receiving elements of the weighing means. On continued rotation of the cranks 22 and 36 the conveying bar is lowered and returned to the position of Fig. 3 for receiving another egg, while the eggs previously carried by the bar are held in position on the weighing means or discharged into the proper compartment depending upon the weight thereof. In this way each egg is positively moved step by step from the egg candling means to the weighing means 6 and if not discharged by the weighing means 6 it is picked up and moved on to the weighing means 8, 10 or 12 so as to be sorted into the desired class by weight.

Any suitable form of weighing means may be used for grading the eggs but as shown we prefer to provide weighing means in the form of a balance having parallel egg receiving rails 48 and 50 which as shown may be connected by loops 52, serving to hold the rails in place while permitting movement of an egg 54 and bar 18 longitudinally with respect thereto, (see Fig. 5).

The rail 50 is secured to one end of a balance beam 56 supported on suitable pivots or knife edges 57 intermediate the ends thereof. The opposite end of the beam 56 is provided with an adjustable weight 58 engaging a threaded rod 60 or otherwise formed for adjustment so as to cause the rails 48 and 50 and the beam 56 to be tilted to the dotted line position shown in Fig. 2 when an egg of the desired weight comes to rest thereon. The weighing means 6, 8, 10 and 12 can thus be adjusted so that the weighing means 6 is actuated to discharge an egg therefrom only when the weight of the egg exceeds a predetermined upper limit. Eggs which are lighter in weight do not cause the rails and balance to be tilted so that the egg is retained in its original position and is subsequently picked up by the conveying bar 18 on the next cycle of operations and moved forward so as to be deposited upon the rails of the scale 8. This scale in turn is adjusted to be actuated by eggs which are lighter than those which actuate the weighing means 6 but which still exceed a second predetermined limit. Similarly the scales 10 and 12 are adjusted to be actuated by eggs of a predetermined weight whereby the eggs are sorted automatically by weight into various classifications.

In order to effect the discharge of eggs from the weighing means upon tilting thereof and yet avoid breakage of the eggs the mechanism is provided with egg removing means in the form of an angle member or trough 62 shown in Fig. 2. The trough is provided with a suitable cushion such as the rubber facing 64 and is supported for rocking movement about the pivots 66. The egg removing means is actuated in synchronism with the remaining elements of the combination by means of a link 68 connected to a crank 70 on the end of the shaft 42. In this way the angle member is moved from the full line position to the dotted line position shown in Fig. 2 during that portion of the cycle in which eggs are being advanced to a new position and deposited upon the rails of the various weighing means. Thus the egg removing means is moved from the position shown in full lines in Fig. 2 to that shown in dotted lines during that period of the cycle in which the bar 18 and related elements are moved from the full line position of Fig. 3 through that of Fig. 4 to the dotted line position of Fig. 3.

In order that the weighing means may function uniformly and accurately under all conditions of operation and even when eggs are deposited thereon in rapid succession means are provided for rendering the weighing means inoperative until the eggs and weighing means have reached a stable condition. For this purpose each of the weighing means is provided with a holding element in the form of a rod 72 carried by an arm 74 and movable into engagement with the balance beam 56 to prevent the beam and rails 48 and 50 from being tilted until the conveying bar has moved away from the egg and the egg has ceased to rock and become centered on the weighing rails. The arm 74 is pivotally mounted at 76 and is engaged by a cam 78 carried by the shaft 42 to raise the arm 74 during a predetermined interval of each cycle and to lower it to engage the balance beam during the remainder of the cycle. When in its lowered position the rod 72 urges the balance beam 56 into engagement with a resilient element 80 carried by an adjustable stop 82 which limits downward movement of the rear portion of the balance beam and serves to locate the rails 48 and 50 in position to receive and support an egg as the bar 18 moves downward away therefrom. The action of the egg in being deposited on the rails, even though it is moved into place rapidly therefore does not cause the balance beam to tilt and it is only after the egg and balance have assumed stable conditions that the rod 72 is raised and the weighing operation permitted. Then if the egg is sufficiently heavy to tilt the balance beam it is discharged onto the egg removing means 62 but if too light is held in position to be picked up by the egg conveying bar 18 and moved on to the next weighing means.

In the construction illustrated the balance beam 56 is supported on pivots or knife edges 57 located below the center of gravity so that when the balance is once displaced it will move directly to its fully tilted position shown in dotted lines in Fig. 2, insuring the discharge of the egg therefrom.

The rail 50 and the balance beam 56 preferably are so arranged that when tilted they are located in position to be engaged by the rod 18 as it moves upward in approaching the full line position of Fig. 3. The rod 18 in moving upward thus serves to return any balances remaining tilted after discharging the egg, to their normal egg receiving position shown in full lines in Fig. 2.

While the construction described is adapted for use in conjunction with any means whatever for supplying eggs thereto it is shown as employed in combination with egg candling means 4 in the form of a chamber 86 having lights 88 therein and provided with a slot 90 through which light passes for candling operations. Inclined rails 92 located on opposite sides of the slot 90 support the eggs to be examined with the axes of the eggs extending transversely of the rails so that the eggs will roll forward by gravity toward the stop means 14. On removal of any egg from the rails 92 either by the operator or by movement of the stop means 14 the remaining eggs move forward so that other eggs may be placed on the rails for examination.

The stop means 14 is carried by an arm 94 pivotally mounted at 96 and bearing against a cam 98 on shaft 42. The stop means is thus raised and lowered in synchronism with the operation of the remaining elements of the mechanism to permit the foremost egg to roll forward into engagement with a rubber covered bumper 100 and into position to be picked up by the conveying bar 18 as it moves into the full line position of Fig. 3. The cam 98 is therefore formed to lift the stop means 14 soon after the bar 18 has passed the dotted line position of Fig. 3 and to be lowered again before the bar 18 reaches the full line position of Fig. 3. In this way the eggs are supplied to the conveying bar one at a time and in the proper timed relation with respect to the operation of other elements of the mechanism. Downward movement of the stop means is limited by the stud 99 so that it does not bear against the eggs but simply limits forward movement thereof.

The operation of the machine will be apparent from the foregoing description thereof but may be summarized as follows:

Eggs to be graded as to quality and weight are placed on the rails 92 of the candling means 4 and roll forward until they engage the stop means 14. Assuming the egg conveying bar 18 and crank 22 to be in the dotted line position of Fig. 3, the stop means 14 is lowered and the foremost egg engages the same. Thereafter as the bar 18 and crank 22 move downward in a counter-clockwise direction toward the full line position of Fig. 3 the stop means 14 is raised and the foremost egg rolls forward into engagement with bumper 100. The stop means is then lowered to prevent other eggs from advancing and the bar 18 moves up beneath the egg so released to pick it up and carry it forward.

As the bar engages the egg the surfaces 46 thereon serve to center the egg so that its long axis extends parallel to the bar. The bar then moves forward depositing the egg on the rails 48 and 50 of the weighing means and moves downward away therefrom leaving the egg supported on the rails. The egg is centered by the rails 48 and 50 and comes to rest almost immediately but the balance beam 56 is held against movement by the rod 72 until a stable condition is assured. Thereafter the rod 72 is raised by cam 78 to render the weighing means operative. If the egg is light in weight the counter weight 58 is not over balanced and the balance beam and rails remain in their original position with the egg supported thereon in position to be picked up and moved on to the next weighing means as the operations continue. However, if the egg is heavy release of the balance beam on upward movement of rod 72 allows the beam to tilt sufficiently to displace the center of gravity and move the balance beam and rails to the dotted line position of Fig. 2. The egg is thus discharged into the egg removing means 62 and the balance beam and rails are free to return to their normal position. If the counter balance weight 58 is not heavy enough to return the beam 54 to its initial position the bar 18 in moving upward will engage rail 50 and restore the balance to its egg receiving position.

The egg removing means is in the full line position of Fig. 2 when an egg is deposited therein but is moved to the dotted line position by crank 70 and link 68 during that portion of the cycle in which bar 18 is moved from the dotted line position of Fig. 4 to the full line position of Fig. 4 and moves upward to lift the eggs and move them forward from one weighing means to another. When in the dotted line position the egg removing means serves to roll the eggs out into the trays 16 so that they are properly classified. The egg removing means then is returned to its full line position for receiving other eggs from the weighing means associated with each tray or compartment of the apron on which the eggs are collected.

It sometimes happens that a compartment becomes filled with eggs so that other eggs cannot be rolled out from the egg removing means 62. In order to relieve this situation the outer edge of the angle member 62 is provided with a downwardly turned flange 102 which on movement of the member 62 to the full line position serves to engage the eggs adjacent thereto to push them gently away from the egg removing means. The flange 102 also prevent eggs from rolling forward beneath the egg removing means into position to be crushed or broken thereby. In practice we have also found that if the rubber lining of the member 62 is allowed to project slightly beyond the edge of the angle member as indicated at 104 that it will engage eggs adjacent thereto as the egg removing means moves toward its dotted line position in Fig. 2 and aid in thrusting them away sufficiently to allow an egg to roll onto the tray 16.

With the construction described above eggs may be graded as to quality and weight very rapidly and in a typical case when the mechanism is driven at a speed of from 20 to 30 cycles per minute it is possible to handle from 3 to 6 crates of eggs per hour, which is much faster than has been possible heretofore.

When it is desired to handle eggs even faster, say at the rate of 8 to 10 crates or more per hour, the mechanism may be modified as shown diagrammatically in Fig. 6 to provide double egg candling or supplying means and double weighing means for each section or compartment of the receiving apron. The candling or egg supplying means shown therefore includes the pairs of tracks 106 and 108 from which eggs are supplied to the conveying bar 110 which is similar to that of Figs. 1 to 5 and actuated in the same manner. The weighing means 112 and 114 are associated with compartment 116 of the receiving apron. For simplicity in illustration only the egg receiving rails of the weighing means are shown but it is to be understood that weighing means such as that illustrated in Fig. 5, or any other suitable form of weighing means may be used. A second pair of weighing means 118 and 120 are associated with compartment 122 and other pairs thereof are associated with the other compartments of the receiving apron 123.

In order to permit the operator to work easily and rhythmically in placing eggs on the tracks 106 and 108 without taking his eyes from the candling means the weighing means and apron 123 are spaced from the candling means and a support 124 provided for receiving an egg container 126.

Between the egg candling means and the first pair of weighing means 112 and 114 is located rest means 128 upon which the eggs are supported during an idle period of operation in their movement to the weighing means. Other rest means 130 and 132 are located between the successive pairs of weighing means. The rest means illustrated in Fig. 7 embodies spaced rails 134 and 136 connected together by the loop member 138 and supported by the flange 140 secured to the bed 142 of the mechanism.

The candling or egg supplying means is provided with double stop 144 controlling the delivery of eggs from tracks 106 and 108 to the conveying bar 110 and the weighing means are provided with elements 146 for rendering the weighing means momentarily inoperative as in the form of our invention illustrated in Figs. 1 to 5.

In the operation of that form of our invention illustrated in Figs. 6 and 7 the eggs from tracks 106 and 108 of the candling means pass into position to be picked up and moved forward by the egg conveying bar 110. During the first cycle of operation the eggs from track 106 and 108 are moved to the positions 148 and 150 respectively on rest means 128 and on the next cycle of operations are moved to the position 152 and 154 respectively on the rest means 128. The eggs are thus advanced toward the weighing means but are held in idle positions ready to be picked up and advanced to the weighing means as the operations continue. On the third cycle the egg in position 152 is moved onto the weighing means 112 and the egg in position 154 is moved to weighing means 114. If the eggs are not discharged by these weighing means the next cycle of operations serves to move the egg on weighing means 112 to the rest means 130 and to move the egg from weighing means 114 to weighing means 118. On further operation of the device the egg previously supported on rest means 130 is deposited on weighing means 120 and the egg from weighing means 118 is deposited on the next rest means 132. The movement of the eggs along the machine from one position to another is thus indicated by the dotted lines 156 and 158 permitting each egg to be passed to weighing means associated with each compartment of the receiving apron.

The eggs when discharged from the weighing and egg removing means 160 pass onto the cushions 162 which as shown are provided with adjacent depressed portions 164. The form of these cushions is such that adjacent eggs, when discharged simultaneously and even when positioned with their larger ends away from each other are prevented from rolling together so as to block the movement thereof downward on the apron and accumulation of the eggs adjacent the egg removing means is eliminated.

This construction not only permits the operator to work easily and rhythmically in candling the eggs but also renders it possible to candle and grade a great number of eggs quickly without taxing the operator or interrupting his work.

While we have shown and described certain preferred forms of our invention which have been found in practice to be very satisfactory it will be apparent that the form and arrangement of the various elements of the combination may be varied considerably and other equivalent means substituted for the particular means illustrated and described. In view thereof it should be understood that the embodiments of our invention shown in the drawings and described above are intended to be illustrative of our invention and are not intended to limit the scope thereof.

We claim:

1. Egg grading mechanism comprising egg supplying means, a plurality of spaced groups of egg weighing means, egg rests located between the egg supplying means and the first group of egg weighing means and between the successive groups of egg weighing means, egg conveying means extending from said supply means past each of said rests and each of said weighing means to the last group thereof and means connected to said conveying means for moving eggs from said supply means to the first rest, thence to the first group of weighing means and then on to the succeeding rests and weighing means.

2. Egg grading mechanism comprising egg supplying means, egg conveying means positioned to receive eggs from said supply means, a plurality of weighing means arranged in spaced relation longitudinally of said conveying means and each including a balance beam with spaced egg supporting means thereon, means for actuating said conveying means to move the same in a vertical plane and through a generally elliptical path between the spaced egg supporting means on said balance beam to pick up eggs from said supply means and lower them onto the egg supporting means on said balance beam and means driven by said actuating means for momentarily preventing movement of said balance beams after an egg has been lowered into place on said egg supporting means.

3. In egg grading mechanism having weighing means, longitudinally extending egg conveying means located adjacent said weighing means, means for moving said conveying means longitudinally with respect to said weighing means, and means for raising and lowering the conveying means, the combination of spaced egg supporting members carried by said weighing means and located on opposite sides of the path in which said conveying means is movable and between the upper and lower limits of movement of the conveying means in position to receive an egg for weighing from said conveying means on downward movement of the conveying means between said egg supporting members.

4. In egg grading mechanism having a plurality of weighing means and longitudinally extending egg conveying means located adjacent each of said weighing means, the combination of means for moving said conveying means in an elliptical path and in a vertical plane and spaced egg supporting members carried by said weighing means and located on opposite sides of the plane in which said conveying means is movable and between the upper and lower limits of movement of the conveying means in position to receive eggs for weighing from said conveying means on downward movement of the conveying means between said egg supporting members.

5. Egg grading mechanism comprising a plurality of spaced weighing means adjusted to respond to progressively decreasing weights and each having a tiltable balance beam, a conveyor in the form of a bar extending longitudinally past each of said weighing means, mechanism for moving said egg conveying bar longitudinally and for raising and lowering said bar and egg supporting members carried by said balance beams and located on opposite sides of said egg conveying bar between the upper and lower limits of movement of the bar.

6. Egg grading mechanism comprising a plurality of spaced weighing means adjusted to respond to progressively decreasing weights and each having a tiltable balance beam, a conveyor in the form of a bar extending longitudinally past each of said weighing means, mechanism for moving said egg conveying bar longitudinally and for raising and lowering said bar, egg supporting members carried by said balance beams and located on opposite sides of said conveyor bar between the upper and lower limits of movement of the bar, and means for holding the egg supporting members on opposite sides of the bar and in predetermined spaced relation comprising loops of material located out of the path of movement of the bar extending transversely of the bar from one supporting member to the other.

7. Egg grading mechanism comprising weighing means having a balance beam with spaced egg supporting members carried thereby, an egg conveyor means for moving said conveyor vertically and longitudinally between said egg supporting members and connecting means located out of the path of movement of said egg conveyor and extending from one of said members to the other transversely of said egg conveyor.

8. Egg grading mechanism comprising weighing means having a balance beam movable about a fulcrum, spaced members for receiving and supporting an egg connected to said balance beam and located unequal distances from said fulcrum so as to cause said balance beam to tilt when an egg is deposited thereon, egg conveying means, means for moving said conveying means vertically and horizontally between said spaced egg supporting members to deposit an egg thereon and means extending from one of said spaced members to the other for holding said members in predetermined positions with respect to the fulcrum of said balance beam.

9. Egg grading mechanism comprising a plurality of pairs of egg weighing means, an egg receiving rest located between each pair of egg weighing means, egg conveying means for moving eggs from said weighing means to said rests and from said rests to said weighing means and means for actuating said conveying means to deposit each egg carried thereby on only one of the weighing means of each pair until the egg has been properly weighed.

10. Egg grading mechanism comprising a plurality of pairs of weighing means and an egg receiving rest located between each pair of weighing means, said weighing means and rests each extending throughout an equal interval of space along a path, a conveyor for moving eggs step by step in equal intervals along said path and onto said weighing means and rests and means for moving said conveyor and the eggs carried thereby a distance equal to two of said intervals of space.

11. Egg grading mechanism comprising weighing means including a balance beam movable in a vertical plane, means for lowering eggs into position or said weighing means to tilt the balance beam, a pivotally mounted member movable in a vertical plane parallel to that in which said balance beam moves and into and out of engagement with said balance beam and continuously operating means actuating said egg lowering means and said member in predetermined timed relation to prevent tilting of the balance beam for a predetermined period after an egg is lowered onto the weighing means.

12. Egg grading mechanism comprising weighing means including a balance beam movable in a vertical plane, means for lowering eggs into position or said weighing means to tilt the balance beam, a pivotally mounted member movable into and out of engagement with said balance beam, a cam for actuating said member, a stop cooperating with said member to hold said balance beam against movement and in a predetermined position during a portion of each cycle of operation and means connected to said egg lowering means and to said member to raise and lower said means and member in predetermined timed relation to prevent tilting of the balance beam for a predetermined period of time after an egg is lowered on to the weighing means.

HERBERT O. NIEDERER.
OTTO C. NIEDERER.